(12) United States Patent
Bagherjeiran et al.

(10) Patent No.: US 9,087,332 B2
(45) Date of Patent: Jul. 21, 2015

(54) ADAPTIVE TARGETING FOR FINDING LOOK-ALIKE USERS

(75) Inventors: Abraham Bagherjeiran, Sunnyvale, CA (US); Renjie Tang, San Jose, CA (US); Zengvan Zhang, San Jose, CA (US); Andrew Hatch, Oakland, CA (US); Adwait Ratnaparkhi, San Jose, CA (US); Ralesh Parekh, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 731 days.

(21) Appl. No.: 12/871,775

(22) Filed: Aug. 30, 2010

(65) Prior Publication Data

US 2012/0054040 A1    Mar. 1, 2012

(51) Int. Cl.
*G06Q 30/00* (2012.01)
*G06Q 30/02* (2012.01)

(52) U.S. Cl.
CPC ............ *G06Q 30/00* (2013.01); *G06Q 30/0255* (2013.01); *G06Q 30/0269* (2013.01); *G06Q 30/0251* (2013.01)

(58) Field of Classification Search
USPC ...................................................... 705/14.66
See application file for complete search history.

(56) References Cited

U.S. PATENT DOCUMENTS

| | | | | |
|---|---|---|---|---|
| 2003/0088458 | A1* | 5/2003 | Afeyan et al. | 705/10 |
| 2006/0188011 | A1* | 8/2006 | Goldszmidt et al. | 375/229 |
| 2008/0139112 | A1* | 6/2008 | Sampath et al. | 455/3.04 |
| 2010/0125563 | A1* | 5/2010 | Nair et al. | 707/709 |
| 2010/0175078 | A1* | 7/2010 | Knudson et al. | 725/14 |

OTHER PUBLICATIONS

Cristianini et al., An Introduction to Support Vector Machines and other kernel-based learning methods, Cambridge University Press, 2000, pp. 9-25.*

* cited by examiner

*Primary Examiner* — John G Weiss
*Assistant Examiner* — Scott C Anderson
(74) *Attorney, Agent, or Firm* — Brinks Gilson & Lione

(57) ABSTRACT

A method for adaptive display of internet advertisements to look-alike users using a desired user profile dataset as a seed to machine learning modules. Upon availability of a desired user profile, that user profile is mapped other look-alike users (from a larger database of users). The method proceeds to normalize the desired user profile object, proceeds to normalize known user profile objects, then seeding a machine-learning training model with the normalized desired user profile object. A scoring engine uses the normalized user profiles for matching based on extracted features (i.e. extracted from the normalized user profile objects). Once look-alike users have been identified, the internet display system may serve advertisements to the look-alike users, and analyze look-alike users' behaviors for storing the predicted similar user profile objects into the desired user profile object dataset, thus adapting to changing user behavior.

16 Claims, 10 Drawing Sheets

ADAPTIVE TARGETING FOR FINDING LOOK-ALIKE USERS

FIELD OF THE INVENTION

The present invention is directed towards internet display advertising, more particularly to user modeling techniques for targeting users.

BACKGROUND OF THE INVENTION

A recent trend in performance advertising is a shift from segment targeting to granular targeting. In the early days of online advertising, advertisers who had made the transition from offline media to online media often thought of users as segments with well-established segment rules. For example, a segment might be comprised of "males between 25 and 34 years of age". Because nearly all offline media channels (e.g. broadcast channels, newspapers, magazines, etc) are only able to measure performance of such offline advertising on the basis of surveys, the statistics that arise from such surveys cover only broad classes or groups of seemingly interchangeable people. In contrast, in the online world, significantly greater granularity of performance measurements are available. With such increased granularity comes the ability to fine-tune an advertising campaign (e.g. for performance with respect to fine-grained targeting), however such fine-tuning presents significant challenges, especially in the area of user modeling techniques that support fine-tuned, highly granular, targeting of users, and more particularly in the area of adaptively finding and targeting "look-alike" users. An advertiser might find (i.e. through measurements in an advertising campaign) that "males of age 28 who live within 10 miles of a metropolis" is the most lucrative segment, and would thus want to target advertising to users who are "males of age 28 who live within 10 miles of a metropolis" and/or who have similar "look-alike" user characteristics. Moreover, the most lucrative segment might shift over time, thus it is desirable that the techniques for finding look-alike users support adaptation of the makeup of the segment as information is cumulatively learned about the segment. It therefore becomes apparent that what is needed are techniques that enable adaptive targeting for finding look-alike users.

Other automated features and advantages of the present invention will be apparent from the accompanying drawings and from the detailed description that follows below.

SUMMARY OF THE INVENTION

A method and system for adaptive display of internet advertisements to look-alike users using a desired user profile dataset as a seed to machine learning modules. Upon availability of a desired user profile, that user profile is mapped to other look-alike users (from a larger database of users). The method proceeds to normalize the desired user profile object, proceeds to normalize known user profile objects, then seeding a machine-learning training model with the normalized desired user profile object. A scoring engine uses the normalized user profiles for matching based on extracted features (i.e. extracted from the normalized user profile objects). Once look-alike users have been identified, the internet display system may serve advertisements to the look-alike users, and analyze look-alike users' behaviors for storing the predicted look-alike user profile objects into the desired user profile object dataset, thus adapting to changing user behavior.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1A:
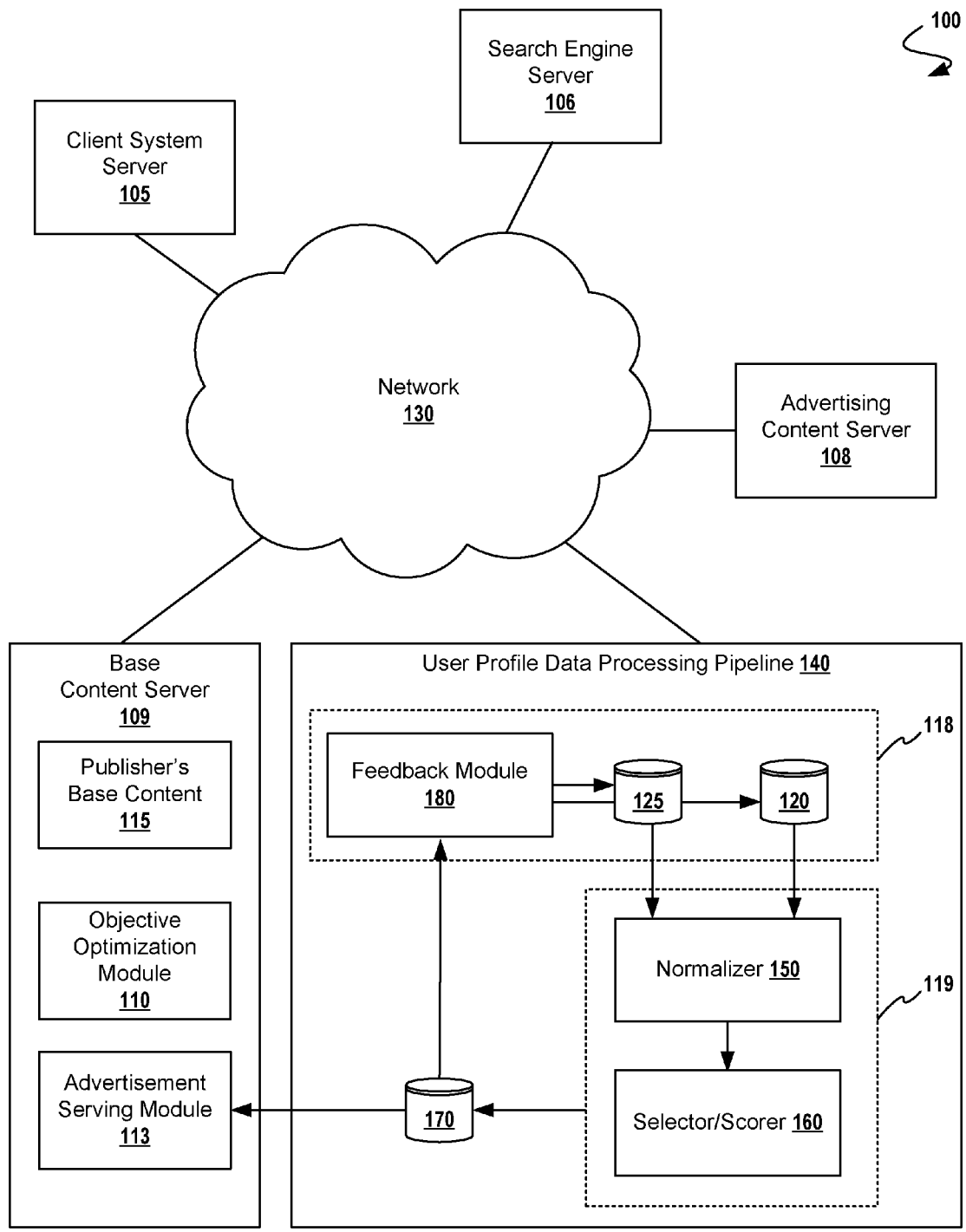
FIG. 1A depicts an advertising server network environment including modules for implementing an adaptive targeting system for finding look-alike users, in which some embodiments operate.

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

Introduction

Instead of a clearly definable but overly general segment definition, advertisers can now think of their users as more specific but less well-defined groups. That is, instead of "males between 25 and 34", advertisers can target people who possess finely-tuned characteristics. For example, an advertiser might want to target finely tuned segments of the population, such as "outdoor enthusiasts with a discriminating taste, who might appreciate the high-end sporting goods offered by a large retail chain". Or, even more likely, an advertiser might provide a database of users (e.g. customers) with the request, "find and target more users like these". Of course, in modern internet advertising systems the database of users might be huge, easily containing millions—even hundreds of millions of users. Similarly, the advertiser might provide a database of users containing a large number of users, so techniques for matching can be quite sophisticated.

Moreover, the definition of a desired user might entail a wide range of characteristics, possibly including behavior over time.

User Search Engine for Finding Look-Alike Users

A search engine that searches over user profiles might be employed to satisfy the advertiser's request. Such a user search engine facilitates the task of advertisers and their sales agents to quickly find users for targeting. Also, such a user search engine might analyze the features of users who responded to ads, thus still more finely tuning the desired user target definition.

Given such a user search engine, and database of users, and more finely tuning the desired user target definition, advertisers might suggest even still more finely-tuned queries such as: find users with similar behavior, users who are currently engaged in doing some activity of interest, and/or users who recently did engage in that activity of interest.

Advertisers can inspect the results of such a query, even still refine their queries, and provide the resulting users as a segment for targeting. In some embodiments, a presentation engine might be provided to advertisers for viewing results pages that might display the size of the targetable population, the performance of the campaign given a set of objectives, the size of suggested similar or adjacent targets, etc. As advertisers refine the definition of targetable users, the query refinements, and interactions with the results, serve to provide some insight to the targeting system, much like traditional ranking in web search, and such insight might be codified as feedback. Then, the refined search query can be used iteratively as a search agent and continuously re-executed for adapting the targeting to ever more narrow (and higher-performing) targets. Alternatively, the query results can be used as seeds for a model and the model is used for targeting.

Processing Advertiser Data for Targeting Look-Alikes

Some advertisers maintain a database of customers with customer information. Often, when planning an advertising campaign, advertisers want to advertise to look-alikes; that is, they want to advertise to prospects who are not yet their customers but exhibit characteristics (including behaviors) that are similar to the existing customers.

A significant difference between the above look-alike problem and standard targeting methods is that the list of users provided by the advertiser contains users who are unclassified except that they are hypothetically similar to the targeted population, as opposed to being provided a targeted population itself or even demographic descriptions of users to target (or not to target). Framed like this, the look-alike problem can be viewed as an instance of positive v. unlabeled classification.

Some types of classification systems use training models, and such training models for look-alikes can use either the customer list alone or can use the customer list in conjunction with a database of other unlabeled users. These other users are unlabeled in the sense it is known merely that the unlabeled users are not in the customer list, but aside from that characteristic, the database of other unlabeled users has no explicit indication or evidence that unlabeled users could not be future customers. Scoring within classification systems that use training models may be performed using a variety of scoring techniques. For example, scoring might employ an instance-based scoring method using k-nearest-neighbor density estimation, or might employ one-class kernel methods, or might employ linear models in order to analyze the characteristics of users with certain score ranges, or any other scoring techniques for that matter.

Adaptively Processing Advertiser Data for Targeting Look-Alikes

In online advertising, advertisers target ads to users based on their behavior and propensity to respond to the advertisement. Some advertisers, called brand advertisers, want to reach as many people as possible with their advertisement(s). These advertisers have little interest in tuning the performance of the advertisement with respect to demographic or other targeting. Other advertisers are interested in measuring performance and in optimizing an advertisement campaign to achieve a specific objective such as return on advertising spend. For these performance-conscious advertisers, finding the right population is critical to achieving the performance goals. Of course, the population of online users changes over time, as well as does the advertiser's database of customers, so advertiser's desire that the optimization adapt to the changing environment. Advertising solutions that do so are termed adaptive targeting. In adaptive targeting, users are targeted through a process of refinement. An advertiser provides an initial list of users (e.g. a "seed list") such as a customer list and an advertiser might also provide a set of constraints such as "target only users residing within the U.S." Alternatively, an advertiser might merely indicate a particular advertisement (e.g. a 'successful' ad), and rely on the system to monitor the behavior of users who respond to the advertisement (e.g. click in the ad, or buy something from the advertiser), thus providing an alternative method for generating a seed set. In either case, the adaptive targeting system automatically adjusts the targeting parameters of an advertisement to find more look-alike users based on the seed list. This helps the advertiser reach the goals of the advertising campaign.

Overview of Networked Systems for Online Advertising

FIG. 1A depicts an advertising server network environment including modules for implementing an adaptive targeting system for finding look-alike users, in which some embodiments operate. The advertising server network environment implements a system for delivery of display advertising. In the context of internet advertising, placement of advertisements within an internet environment (e.g. environment 100 of FIG. 1A) has become common. By way of a simplified description, an internet advertiser may desire to reach a particular target audience and may create an advertisement such that whenever such an internet user, via a client system server 105 renders the web page from the client system, possibly using a search engine server 106, the advertisement is composited on a web page by one or more servers (e.g. base content server 109, advertising content server 108) for delivery to a client system server 105 over a network 130. Given this generalized delivery model, and using techniques disclosed herein, sophisticated online advertising might be practiced. More particularly, an advertising campaign might include highly-customized advertisements delivered to a user corresponding to highly-specific target predicates (e.g. constraints) that may be used in conjunction with adaptive targeting for finding look-alike users. Again referring to FIG. 1A, an internet property (e.g. a publisher hosting the publisher's base content 115 on a base content server 109) might be able to measure the number of visitors that have any arbitrary characteristic, demographic, target predicates, or attribute, or other look-alike characteristic, possibly using user profile data processing pipeline 140.

In embodiments of the systems within environment 100, components perform processing such that, given an advertisement opportunity (e.g. an impression opportunity), processing determines which (if any) advertisement(s) match the advertisement opportunity. In some embodiments, the environment 100 might host a variety of modules to serve management and control operations (e.g. an objective optimization module 110, an advertisement serving module 113, etc)

pertinent to serving advertisements to users. In particular, the modules, network links, algorithms, serving policies, and data structures embodied within the environment 100 might be specialized so as to perform a particular function or group of functions reliably while observing capacity and performance requirements. For example, a user profile data processing pipeline 140 might be employed to implement adaptive targeting for finding look-alike users within a display advertising system.

More particularly, a user profile data processing pipeline 140 might process a desired user profile dataset 125 and a known user profile dataset 120 to be used in conjunction with a normalizer module 150, a selector/scorer module 160 in order to produce another dataset, namely a predicted similar user profile dataset 170. Also shown is a feedback module 180 for adapting to changing user behavior. The aforementioned modules might be organized into processing sections, for example an adaptive feedback section 118, and/or an adaptive machine-learning section 119.

Returning to the discussion of adaptive targeting, instead of targeting an easily characterizable (but overly general) segment of users, advertisers can now think of their users as belonging to much more specific (but less easily characterizable) groups. That is, instead of "males between 25 and 34", advertisers can target people who are "outdoor enthusiasts with a discriminating taste, who might appreciate the high-end sporting goods offered by a large retail chain".

From an advertiser's perspective, the easily characterizable segments have broad reach and are easy to match, but performance metrics that include conversions (e.g. clicks per impression) may suffer. The latter is less easily characterizable and probably much smaller in terms of reach, but potentially of high value to the advertisers, and they would be willing to pay more to reach users in these high-value segments.

Use of HTML Beacons

Although the advertiser might not be able to predict whether a user belongs to a high-value segment, they can instrument their websites to trigger when a desired user appears. An example of such enabling technology is the HTML beacon. Most high-volume advertisers instrument their websites with beacons such that when a user visits a particular page, an event is recorded and that event can be used for decision-making in advertising campaigns. These beacons (sometimes called pixels because they are implemented in HTML as remote img tags that render invisible 1×1 pixel images), are an improvement to understanding users' behaviors. Advertisers place these beacons on special pages that only high-value users visit (e.g. such as payment confirmation pages). When a user visits these special pages, the beacon fires and an event is recorded indicating a visit by a high-value user.

Several business constraints shape the design of solutions. For example, some of the following business constraints may shape or otherwise impose some restrictions on a solution:

Each advertiser has a different definition of the beacon: For some advertiser, a high-value event might be the purchase of a product. For other advertisers, merely visiting the home page of a site is a high-value event.

The advertiser's definition of the beacon is not always known in advance.

Advertisers consider this data to be very sensitive, and in some cases the data is subject to government regulation.

Advertisers want to be assured that the information cannot be used to aid their competitors.

Also, there are other technical issues that may shape or otherwise impose some restrictions on a solution. Some beacon-related events are only recorded after advertisement impressions are served. Some are only recorded after a successful advertisement click.

Overall, the average click rate might be low (e.g. ~0.1%). The average post-click action rate might also be low (e.g. ~1%), so the overall conversion rate might be extremely low (e.g. ~0.001%). Thus, relatively few user events will be recorded. For example, a typical advertisement campaign might targets 1M users per day, which (following the above example) yields an average of 10 conversions per day.

One possible solution trains models for each conversion beacon and the training model is updated as new beacon events arrive. Advertisers provide examples of users who have already converted (e.g. via a known user profile dataset 120) and provide examples of users who could be converters (e.g. via a desired user profile dataset 125). For generating a machine-learning training model (e.g. machine-learning training models $525_0$-$525_N$), the system uses objects within a desired user profile dataset 125 as a seed, and produces training models (discussed below), then trains classifiers and scores a (potentially large) population of users for a match. As these users interact with the ad, more examples of users who have converted are generated and then selectively added to the known user profile dataset 120. Thus, the classifier models are improved iteratively as new data arrives.

Figure 1B:
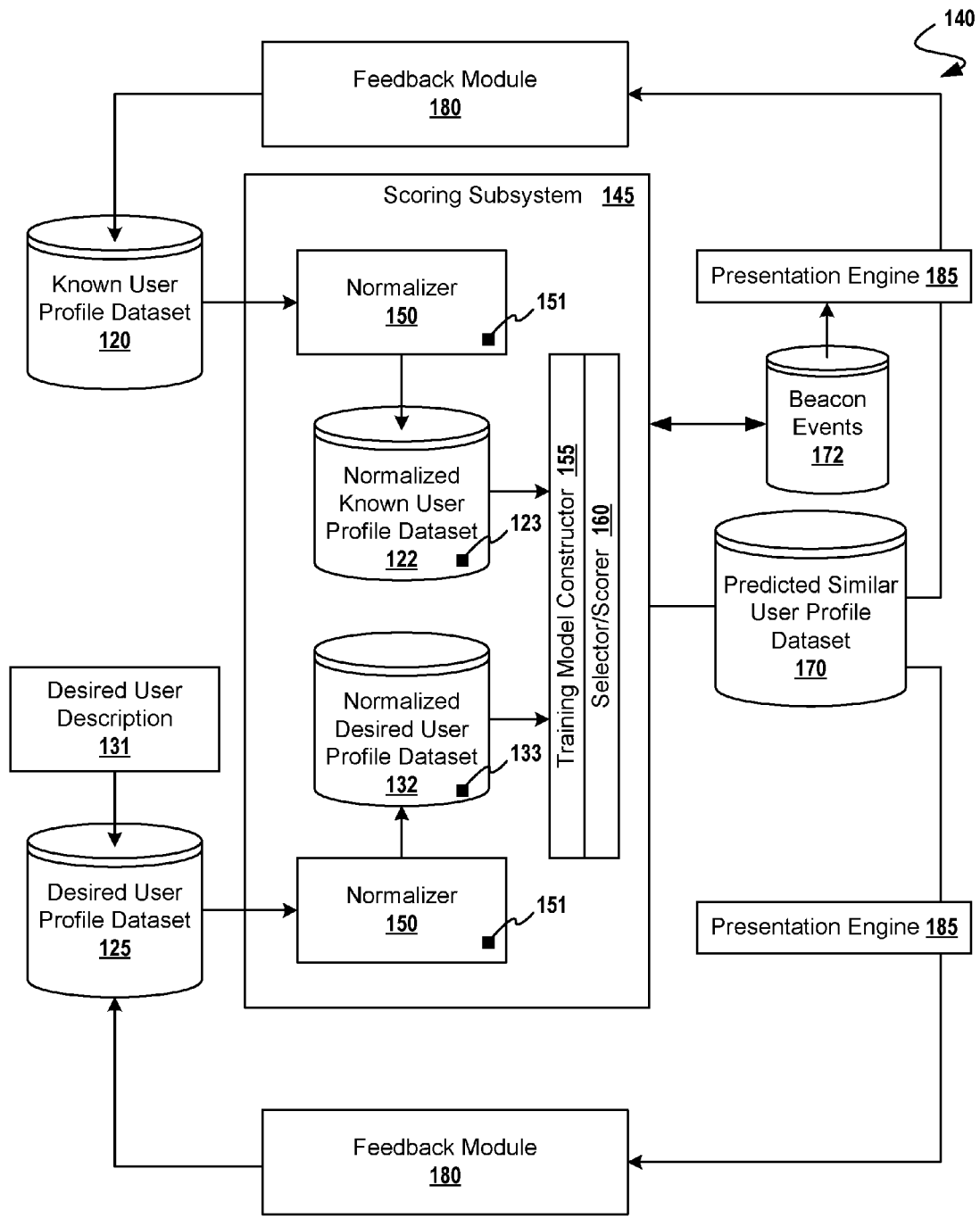
FIG. 1B depicts a user profile data processing pipeline, including modules for implementing adaptive targeting for finding look-alike users, in which some embodiments operate.

FIG. 1B depicts a user profile data processing pipeline 140, including modules for implementing adaptive targeting for finding look-alike users, in which some embodiments operate. As shown, the user profile data processing pipeline 140 comprises three datasets: A known user profile dataset 120, a desired user profile dataset 125, and a predicted similar user profile dataset 170. Strictly as an example, one embodiment of a known user profile dataset 120 might be a set of, for example, one hundred million internet users for whom each user has a user profile. Also, strictly as an example, one embodiment of a desired user profile dataset 125 might be a set of user profiles as provided by an advertiser (e.g. using a desired user description 131). In another embodiment, a desired user profile dataset 125 might be populated based on a set of user profiles as provided by an advertiser based on recorded events from the advertiser's beacon.

Using a known user profile dataset 120 and a desired user profile dataset 125 as inputs to the scoring subsystem 145, the scoring subsystem may then produce a predicted similar user profile dataset 170. The summary analysis or statistical analysis of the predicted similar user profile dataset 170 might be presented to the advertiser using an instance of a presentation engine 185, and using such a presentation engine 185 (possibly in conjunction with a feedback module 180), the user might select some (or all or none) of the records in the predicted similar user profile dataset 170 to be provided as feedback to a feedback module. Then, some (or all or none) of the selected records from the predicted similar user profile dataset 170 might be added to the known user profile dataset 120, thus completing one possible loop for adaptation.

Continuing the discussion of FIG. 1B, and as shown, a normalizer 150 is employed to accept and adapt records within a dataset, and then to serve for normalizing records for providing to a training model constructor 155. A normalizer is employed in order to select only specific features of a user profile, and in order to modify data items within a user profile so as to facilitate comparisons and/or further manipulations. The normalized data sets are provided as inputs to a training model constructor 155, and the normalized desired user profile object 133 is used for seeding a machine-learning training model. As shown, the normalized known user profile dataset 122 (as shown, containing normalized known user profile object 123) and the normalized desired user profile dataset 132 (as shown, containing a normalized desired user profile object 133) are provided as inputs to a training model constructor 155. A selector/scorer module 160 then classifies the normalized user profiles and selects a portion of the known user profile dataset 120 based on classification (or other prediction or correlation techniques) against a desired user profile dataset 125, thus producing a predicted similar user profile dataset 170.

As regards the adaptive nature of the user profile data processing pipeline 140 within a system for adaptive targeting for finding look-alike users, an adaptive feedback loop is provided so as to selectively add user records to the known user profile dataset 120. Similarly, an adaptive feedback loop is provided so as to selectively add user records to the desired user profile dataset 125, which is provided to facilitate the effect of iteratively improving the seed set. In either or both of the feedback cases just discussed, a feedback module 180 may be employed. Moreover, the feedback loop might include input of beacon events 172, which events might include entire user records of those users who triggered the beacon event.

Extensible Architecture Embodiments

Of course there are many variations or combinations of modules for implementing a user profile data processing pipeline 140. As well, there are many possible representations of data structures (e.g. user profile data records), including data structures that are extensible. In one embodiment (not shown) an architecture is comprised of the user profile data structure profile representation, a processing stack, and extensible modules. The user profile representation contains raw and derived features from a user's profile. The processing stack brings together the different components that process the user profile representation for training and scoring models. The extensible modules provide quality, stability and performance but yet are extensible enough to facilitate prototypes.

The data of the user profile representation may be encoded as a simple key-value pair format consisting of the historical events (e.g. beacon events) generated by the user. Associated with an event is metadata such as the content of a page, which can be included inside the profile or joined via database operation as needed. The schema is stored on disk and is accessible to modules of the processing stack. In some cases, the profiles are partitioned by user id and stored in sorted order so that joins can occur efficiently.

The processing stack is hosted in an execution environment which is stable enough to run production-grade processes, yet flexible enough to be customized for any application. It consists of three major concepts: workflows, tasks, and modules. Each task in the workflow may be implemented as an independent unit of work that may perform any function.

Multiple extensible modules are provided: for example, an ingester, an annotater, modules for join, lookup, and modules for scoring, etc. Strictly as an example, the ingester extensible module is an adapter between a foreign input data format and the user profile representation (e.g. user profile object 300). Multiple data sources can be read and each passed through a different ingester so that the results can be merged into a convenient user profile representation. The annotater extensible modules can extract any desired features. In the envisioned embodiment, the join extensible module can take advantage of the sorted storage method for user profiles to perform a map-side merge join so that new data sources can be easily added without the overhead of a reducer-side join. The lookup extensible module appends metadata associated with any feature such as the content of pages. This allows the user profile to contain only the join keys and defer the join to a time later in the overall processing within the processing stack. Finally, the extensible scoring module applies one or more scoring fuctions (e.g. a linear model) to the generated features in order to produce a score for each model.

Dataflow View of Embodiments

While the architecture as described above and shown in FIG. 1A and FIG. 1B prescribes specific functions to specific modules, many other architectural possibilities exist, any of which might serve the functions of end-to-end processing. It is possible to view solutions of adaptive targeting for finding look-alike users as a series of operations for retrieval. That is, given an ad, return the set of users who are likely to respond to the advertisement. Indeed, similar to standard document retrieval methods, end-to-end processing methods for this sort of targeting produces a ranked list of documents (users) in response to a query (an ad).

Figure 2:
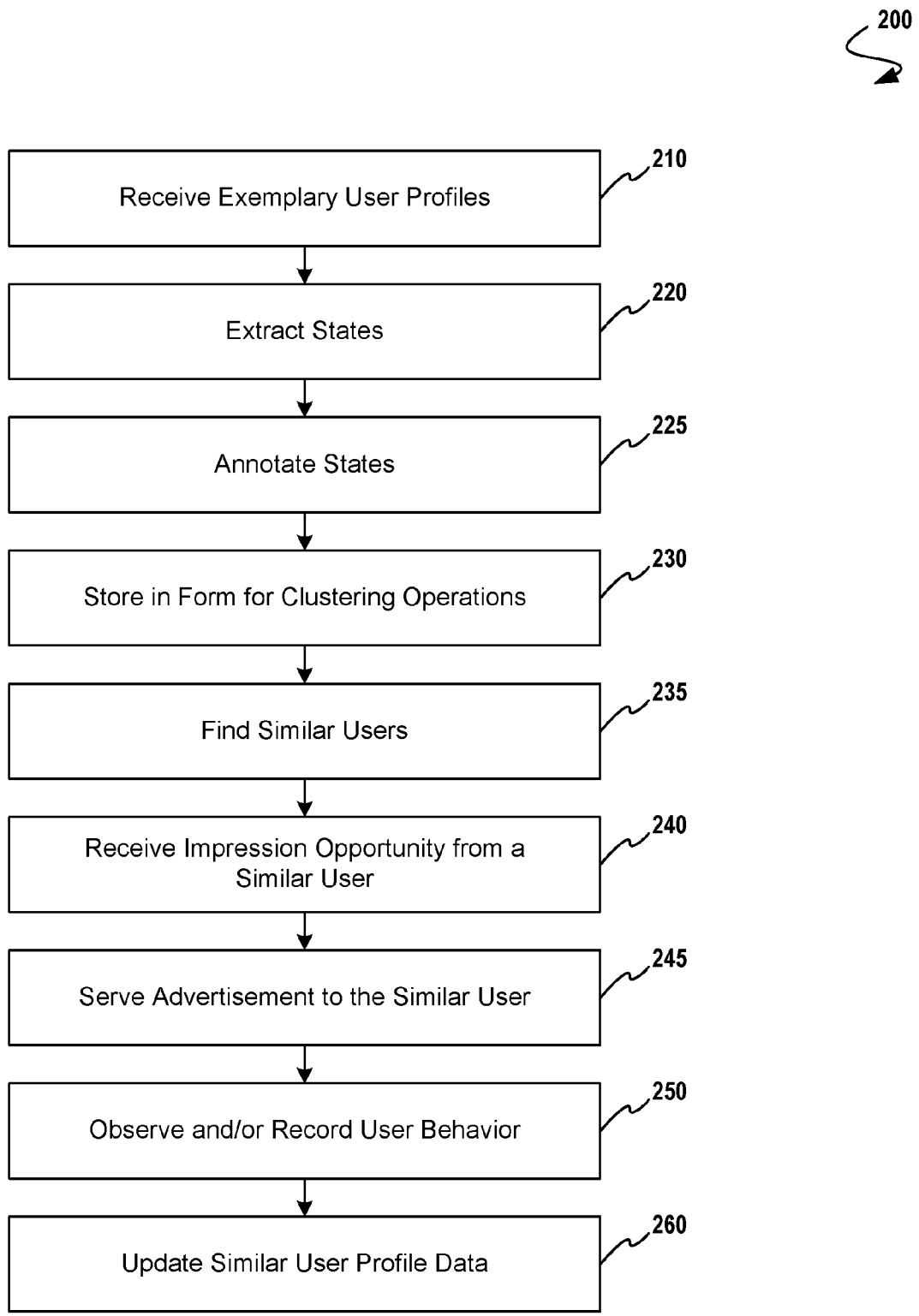
FIG. 2 depicts a method for adaptive targeting for finding look-alike users, according to one embodiment.

FIG. 2 depicts a method 200 for adaptive targeting for finding look-alike users. As shown, the method commences by receiving a database of exemplary user profiles (see operation 210), from which are extracted various states or features from the exemplary user profiles (see operation 220). Of course the exemplary user profiles may include any combination of user profiles as may be found in known user profile dataset 120, a desired user profile dataset 125, and/or in a predicted similar user profile dataset 170.

The extracted states of interest are then annotated so as to serve in subsequent processing (see operation 225). For example, extracted states of interest might be annotated with pre-calculations performed on the user dataset, which pre-calculations might serve in clustering operations (e.g. pre-calculating some aspect of a similarity function). Such an annotated user record might then be stored for a clustering operation (see operation 230). Those skilled in the art might recognize that clustering operations performed on a large dataset might be computing resource intensive, and this certain aspect of the aforementioned storing operation might be performed expressly to facilitate access by an operation (e.g. a clustering operation) to find similar users (see operation 235).

The operations from operation 210 through operation 235 result in a dataset of similar users who are predicted to click on an advertisement from a particular advertiser. Thus, when a similar user who is predicted to click on an advertisement from a particular advertiser is in a position to be served such an advertisement (see operation 240), the advertisement is served (see operation 245), and the similar user's behavior is observed and possibly recorded (see operation 250).

Now, as regards the adaptive nature of the user profile data processing pipeline 140 within a system for adaptive targeting for finding look-alike users, should the observed similar user's behavior be deemed to be characteristic of a desired user, then that similar user's profile is added to one or more datasets (see operation 260). As exemplary examples, and as shown in FIG. 1B, such a similar user's profile might be added to a known user profile dataset 120, and/or to a desired user profile dataset 125.

Figure 3A:
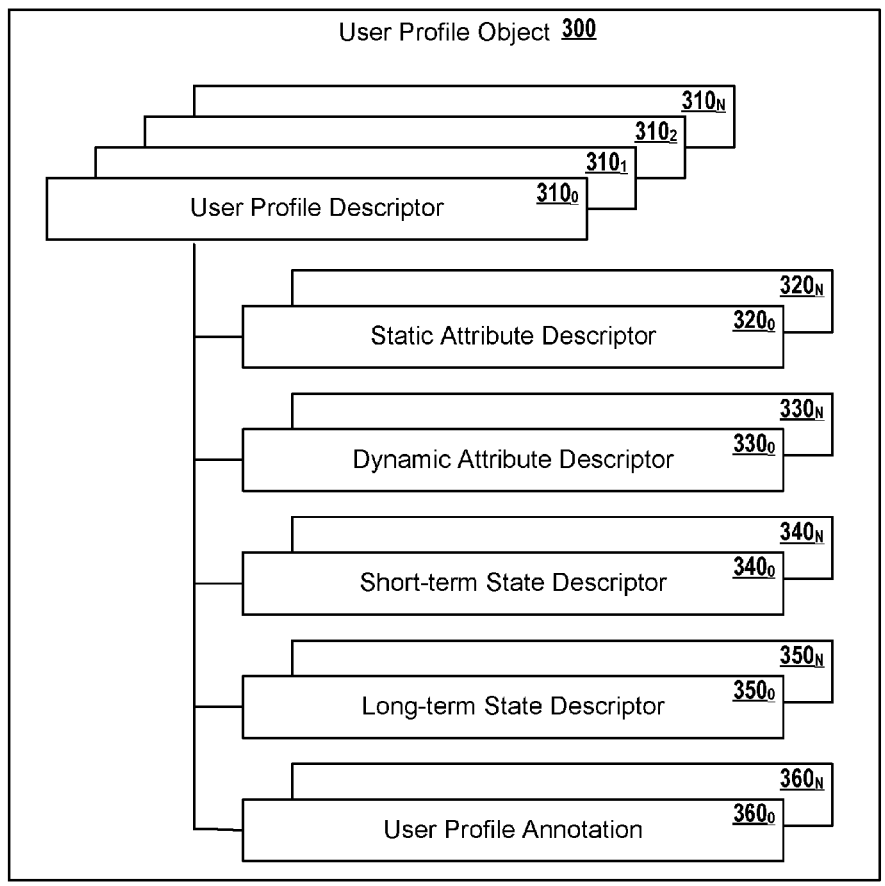
FIG. 3A depicts a data structure showing one of a plurality of user profile objects, according to one embodiment.

FIG. 3A depicts a data structure showing one of a plurality of user profile objects. As shown, FIG. 3A depicts an exemplary data structure showing one of a plurality of user profile objects 300 which might comprise one or more user profile descriptors $310_0$-$310_N$, which in turn may contain or be associated with one or more static attribute descriptors $320_0$-$320_N$, one or more dynamic attribute descriptors $330_0$-$330_N$, one or more short-term state descriptors $340_0$-$340_N$, one or more long-term state descriptors $350_0$-$350_N$, and one or more user profile descriptor annotations $360_0$-$360_N$.

A data structure, such as exemplified by user profile object 300, might be used in a display advertising modeling context. For example, a user profile object 300 might be used to implement adaptive targeting for finding look-alike users. As earlier foreshadowed, user profiles can be modeled as an object comprising an ordered sequence of states (from which objects are extracted from various states or features from the user profiles); such state-oriented models are discussed below.

Figure 3B:
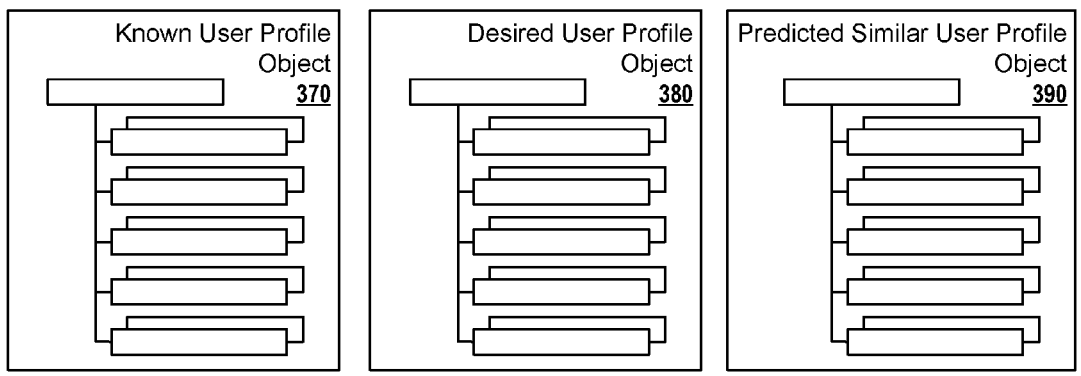
FIG. 3B depicts exemplary user profile objects, according to one embodiment.

FIG. 3B depicts exemplary user profile objects. As shown, FIG. 3B depicts a known user profile object 370, a desired user profile object 380, and a predicted similar user profile object 390.

Formal Model of User History

User profiles can be modeled as an ordered sequence of states. Initially, the user starts as a blank slate. Denote a user u as an ordered sequence of states $s_t$ and is written as:

$$u = \langle s_1, \ldots, s_n \rangle$$

where each $s_t \in S$ denotes the state of the user. Without loss of generality, assume that the index for a state denotes the time at which the user has that state and further that there exists a state at each time. The state of the user changes as the result of an event. Thus, according to a state-oriented view, the user can be characterized as a sequence of events $\langle e_1, \ldots, e_m \rangle$, where $e_t \in E$, rather than restricting the characterization to a single transitory state of the user. One objective of user modeling is to infer the single transitory state of the user $s_t$ given the sequence of observed events $\langle e \rangle$. Note that for this discussion, the only assumption made about the state of the user is that the states are ordered in a sequence. Later, additional assumptions attendant to prediction and analysis will be discussed.

User Search

The above state-oriented view of users is general and shares many characteristics with multimedia retrieval. Consider the retrieval operators as follows:

$$\tau(u, t_1, t_2) = \{e_t | t_1 \leq t \leq t_2\}$$

$$\tau(u, t) = \tau(u, 0, t)$$

$$\dot{\tau}(u, t) = \tau(u, t, t)$$

where $\tau(u,t)$ consists of the events of the user prior to some time t and $\dot{\tau}(u,t)$ is the state of the user at precisely the moment t. It is possible to relax the formalism a bit and to consider the sequence of events as a set. In cases where the state contains a notion of time, then these representations (sequence versus set) can be regarded as equivalent for the purposes herein disclosed.

Within such a set-oriented user representation many common modeling tasks may be formalized. The following are examples of retrieval frameworks for users, where each separate retrieval framework is dependent on interpretation of the temporal component of the set elements:

User Pattern Search: Return users $$R(u,t,\alpha) = \{v | \theta(\tau(v,t_1,t_2), \tau(u,t'_1,t'_2)) > \alpha \wedge t_1, t_2, t'_1, t'_2 < t\}$$

Find a set of users whose historical behavior is similar to the current user's historical behavior, where $\theta(u,v)$ is a similarity function between user profiles. Such a retrieval pattern is used in recommendation systems, which seek to identify users who (in the past) did what the current user is doing now, and thus the current user can be predicted to follow at least some aspects of the identified sequence.

User Tracking: Return users $R(u,t,\alpha) = \{v | \theta(\dot{\tau}(v,t), \dot{\tau}(u,t)) > \alpha\}$. Find a set of users who are doing the same thing now. For example, the users who are, as of this moment, checking their e-mail or visiting some website.

User Targeting: $R(u,t,\alpha) = \{v | \theta(\tau(v,t_1,t_2), \dot{\tau}(u,t)) > \alpha \wedge t_2 \leq t\}$. Find a set of users who have previously done what the current user is doing at this moment. For example, users who had historically purchased car insurance had previously searched for "car insurance", so such user targeting would predict actions to take (e.g. show an advertisement for car insurance) for the current user as soon as the user searches for "car insurance".

Implicit in these retrieval models is some similarity function $\theta: S^* \times S^* \to [0,1]$ that compares the states of the users.

Consider other machine learning aspects within this model:

Sequence Prediction: $P(\dot{\tau}(u,t+1) | \tau(u,t))$. Given the historical activity of a user, predict the next sequence.

Event Prediction: $P(s \in \dot{\tau}(u,t+1) | s \notin \tau(u,t))$. Predict new events that the user has not yet done but might so do in the future, such as click on an advertisement. This is a special case of sequence prediction.

Advertising: Assume that the user's state changes according to a transition probability $T(\dot{\tau}(u,t+1), \alpha, \dot{\tau}(u,t))$. Then take an action a to maximize the long-term expected reward.

Similar Users: Given a list of users L and a set of events for each user, $(u, t_i)$, return a list of users ranked according to $P(u \in L)$.

Figure 4:
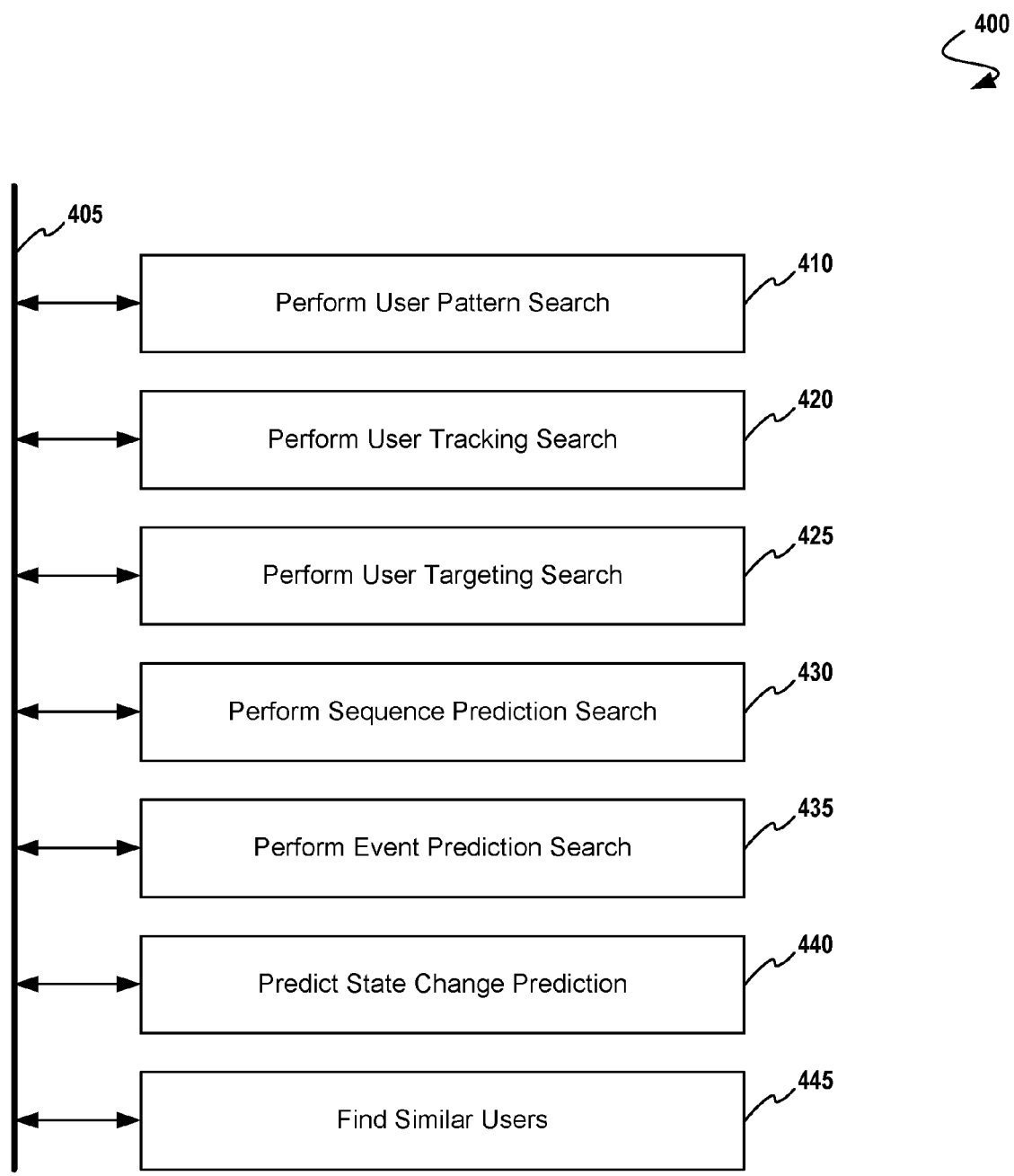
FIG. 4 depicts an operation chart of a method for finding similar users, based on temporal components of a user profile, according to one embodiment.

FIG. 4 depicts an operation chart of a method for finding similar users, based on temporal components of a user profile. As shown, various operations to find similar users might be supported by temporal analysis of users, which might include any one or more operations, such as performing user pattern searches (see operation 410), performing user tracking searches (see operation 420), performing user targeting searches (see operation 425), performing sequence prediction searches (see operation 430), performing event prediction searches (see operation 435), and/or performing state change prediction searches (see operation 440). Any one or more (or none) of the aforementioned operations 410-440 might be performed, possibly serially, or possibly in parallel, in advance of the operation to find similar users (operation 445), and any one or more of the aforementioned operations 410-445 might communicate with any other operation over communication bus 405. In fact, in embodiments of the selector/scorer module 160 (see FIG. 1B), the sequence of operations to find similar users 400 might be implemented in a pipeline of operations. Of course the sequence of operations to find similar users 400 is only one aspect of a data processing pipeline, and other aspects are discussed briefly below.

Data Processing Pipeline

This section provides an overview of how user profiles are constructed and used for targeting.

Figure 5:
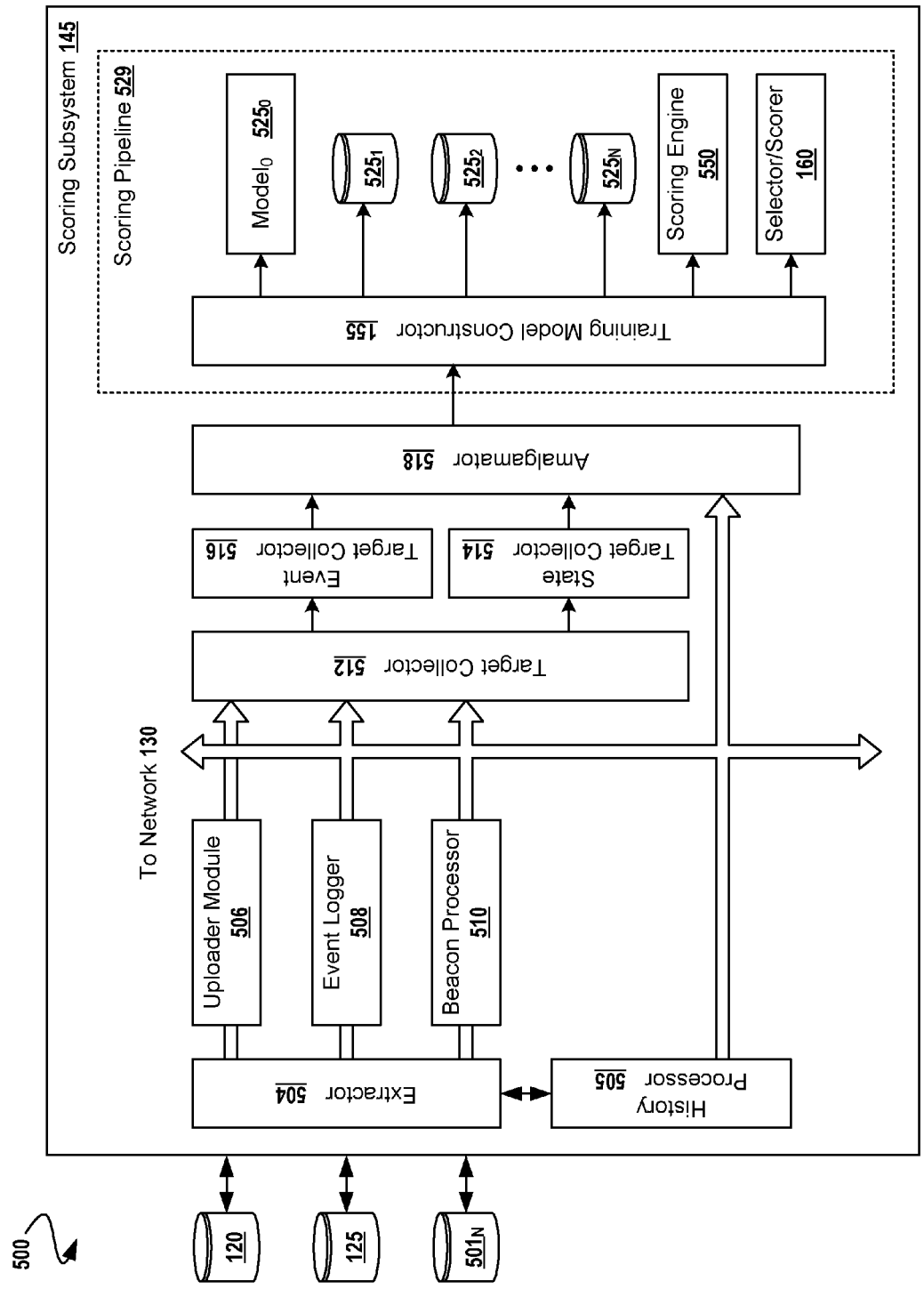
FIG. 5 depicts an environment in which a data processing pipeline including a scoring subsystem operates, according to one embodiment.

FIG. 5 depicts an environment 500 in which a data processing pipeline including a scoring subsystem operates. As shown, the scoring subsystem is connected to databases using any known method for database connection. More particularly, the scoring subsystem 145 reads from a known user profile dataset 120, from a desired user profile dataset 125, and from any other database or databases (e.g. external database 501). An extractor 504 and a history processor 505 operate in a parallel pipeline stage to provide input to several other pipeline data processing modules, specifically, an uploader module 506, an event logger 508, a beacon processor 510, and a target collector 512. The specific operations of the aforementioned modules are discussed below. As shown, any of the aforementioned pipeline data processing modules can communicate one with another, or with any other device over the network 130. In fact, any of the pipeline data processing modules shown in environment 500 may communicate one with another, or with any other device, over the network 130 (though for simplicity, not all connections are shown).

A target collector 512 captures a user-timestamp pair, thus organizing data in a manner that facilitates analysis of temporal events associated with the users. More particularly, a plurality of user-timestamp pairs may be processed (possibly in parallel) by a state target collector 514 and an event target collector 516. Continuing through the stages of the scoring subsystem 145 within the data processing pipeline, an amalgamator 518 assembles the various data from the collectors (and possibly from the history processor 505), and the training model constructor 155 serves for producing a plurality of models 525 in a format suitable for scoring and selection. As shown, a model might be provided in the form of module as depicted for model $525_0$, or a model might be provided in the form of a set of parameters as depicted for model $525_1$, or a model might be provided in the form of a dataset, as depicted for model $525_2$.

Once at least one such model is available, scoring and selection might commence. As scoring engine is provided for predicting if a particular known user (e.g. a user described in a known user profile dataset 120) can be predicted to behave similarly to a target user (e.g. a user described in a desired user profile dataset 125) and as determined by scoring the particular known user against one or more of the models 525. Of course, there are cases when a particular known user, or a class of particular known users, score well against the model(s), yet for other reasons may be deselected for reasons that can be described by demographics or heuristics.

Pipeline Processing Details

The user profile data processing pipeline 140 performs the tasks of training models and scoring users. Typical embodiments scale up in order to process and score hundreds of millions of user profiles using thousands of models. Also, typical embodiments support a flexible user profile that permits rich raw and derived features. For training models, the pipeline retrieves user profile objects from the desired user profile dataset 125, annotates them with the profile, and builds or updates the models. For scoring, the pipeline annotates users with features and then applies the models, storing models in models $525_0$-$525_N$.

Training

The training pipeline extracts targets (i.e. users, user profiles, user-event pairs, user-timestamp pairs) from different sources. It then joins the targets with other profiles and trains or updates predictive models.

Targets are collected from several sources described as follows:

Batch Upload: Targets arrive daily or weekly, often through a manual process or file upload using an automated module (e.g. uploader module 506).

Event Logs: Targets are present in click logs, user data objects, or portions thereof corresponding to clicks on an advertisement, which may be delivered to any logger (e.g. event logger 508), with the events arriving about as soon as the event occurs.

Beacons: Events that are fired when a user visits a particular page may be delivered to any beacon processor (e.g. beacon processor 510), with the beacon events arriving about as soon as the event occurs.

For targets that arrive through an automated process such as beacons or event logs, target collection may be automated, for example, using the target collector 512 within a scoring subsystem 145. Operations for processing targets within a scoring subsystem 145 might distinguish these two types of targets:

Events: A user performed some action of interest at a specific moment in time.

State: A user possesses a particular quality (or is associated with a particular quality) that makes him or her desirable to the advertiser.

For event targets, the state of the user at the moment the target occurs is of temporal importance. The intuition behind this is that events of interest are "triggered" by other events in the profile. The recency of the trigger event is often highly correlated with the event of interest. Examples of event-based targets are users who have applied for a credit card, or users who are looking to buy a new car. For state targets, features tend to be less temporal or transient, more typically 'state' refers to static features. The intuition here is that state is an inherent property of the user and is not triggered by any recent event. Examples of state-based targets include (1) Spanish-speaking users, (2) users whose primary means of web access is a mobile phone, (3) sports enthusiasts, etc.

Event-based targets tend to correlate to commercial activities (such as buying or selling) because commerce is typically a transactional process. State-based targets are often used as proxies for event-based targets. Advertisers often have done third-party research to determine that, for example, people who use mobile phones would be interested in buying the new mobile phone; this is a state-based match of a user to a display advertisement. An event-based match would target users who exhibit triggers (i.e. a sequence or set of events) that would tend to correlate to other users that have recently purchased a new mobile phone. In some embodiments of an adaptive targeting system, modules within an adaptive machine-learning section 119 would learn what these triggers are.

Join Targets

In order to construct the training data, the history of the user and the target information is joined using an automated process (e.g. an amalgamator 518). Each user has associated with it a profile comprising a stream of events within a time window. For targets that are more heavily associated with user events, the history of the user is extracted at the moment just prior to the event. For targets that are more heavily associated with user states, the timing of the user's history does not need to be precise:

$$J(u, e_{t,\hat{a}}^{(i)}) = (u, \langle e_1, \ldots e_T \rangle, e_{t,\hat{a}}^{(i)})$$

Feature Vector Construction

For both scoring and training, models include selected features, and the models are constructed based on the events in the profile. Some feature construction techniques transform a raw event stream into a feature vector that conveys the relevant information about the users:

$$(u, (f_1(\langle e \rangle), \ldots, f_k(\langle e \rangle)), f(e_{t,\hat{a}}^{(i)}))$$

Model Training

After feature vectors are constructed, the models are trained to predict the targets. In some embodiments, including the embodiment shown within environment 500, all models are trained in parallel. The trained models are then applied to incoming user profiles and scores are computed (e.g. using a scoring engine 550).

Scoring

The scoring pipeline 529 is a streamlined version of the training pipeline. The target collection and join steps are skipped. Only the feature construction step needs to be run followed by the scoring.

Constructing a User Profile

Returning to the discussion of FIG. 3, a user profile object might contain all information known about the user, and the object is intended to be populated with new information, incurring as little latency as possible. As earlier discussed, user features may be classified into user features associated with state (static feature) versus user features associated with events (in temporal sequences). As is disclosed below, the sequences of events by which a user can be comprehended may be used in matching a known user profile object to a desired user profile object (thus creating a candidate predicted user profile object). Again referring to an earlier example, if a user as identified by the advertiser can be recognized as having "purchased a car", and then having "purchased car insurance", then other users for which events are known might be checked for that sequence, and if present, that checked user's profile object would become a candidate for entry into the predicted user profile dataset. Of course, in order to do such a checking, the user profile must be able to contain such a sequence, and the specific sequence for a particular user must be recorded in a user profile object. Accordingly the activities of the users are a sequence of events collected from server logs:

$$H(u) = \langle e_1, \ldots, e_n \rangle$$

where there are n time periods denoted by $\tau$ and $e_\tau$ indicates the set of events that have occurred during the time period $\tau$, such as a search or a visit to some web page. Events may be associated with additional information. For example, an event could be a search query (for example, the query "machine learning") on a search engine and the text of the query is associated with the event along with the identity of the user and the time. As such, events can be linked with each other. Now, assume that there is a feature extraction operator $F_T(\cdot)$ that extracts from each event some feature representation. Further, consider several different events, each with a corresponding feature extraction operator:

Visits: Pages visited on a particular web page, $F_p$. Visited pages may be recorded and clustered based on navigational patterns. In an exemplary embodiment, the visit feature can be compactly represented in text format using the id of the cluster.

Queries: Search queries, $F_q$. Searches on a search engine (e.g. Yahoo! Search), and clicks on search links, and possibly also clicks on search advertising links. The query feature can be compactly represented using the text of the query, text of the URL(s) of the results page links, and text of the URL(s) of any advertisement clicked.

Results Contents: Contents $F_p$ can be text extracted from pages visited from a search result. That is, for each clicked link from the search page, the content of the resulting page is crawled. Text features are extracted from these pages.

Graphical Ads: $F_a$ views and clicks on ads. The features of the advertisement can be represented compactly in text for using the id of the advertisement.

In the embodiment depicted in FIG. 1B, event features might be normalized (e.g. using a normalizer 150) into common, compact representations as follows:

ID features: The cluster ID of the page, of the advertisement, or the query itself.

Category: A taxonomy classifier 151 may be trained to categorized ads, pages, and queries, and to map into a common taxonomy. The pair comprising a category label and an event type are used as a feature representation.

The feature extraction operators output textual features of the following types:

Stemmed unigrams (possibly using porter stemming)

Phrases that match search queries.

Phrases that match a phrase bidded on by some advertiser.

Details of the URL visited. For example, details of a page might include details such as the hostname of the page.

Ongoing Management of a User Profile

A challenge of user profiles is that they change often and continuously. Each event brings with it important new information that may affect targeted advertising. Advertising services that operate online must be aware of the user's profile at the current time. Much of the aforementioned processing, however, is compute intensive and often processed in offline operations. Bridging the offline and online view of the user profile is important to the success of adaptive targeting. Accordingly, some embodiments include a user profile server that serves for providing temporally updated user profiles on demand.

Figure 6:
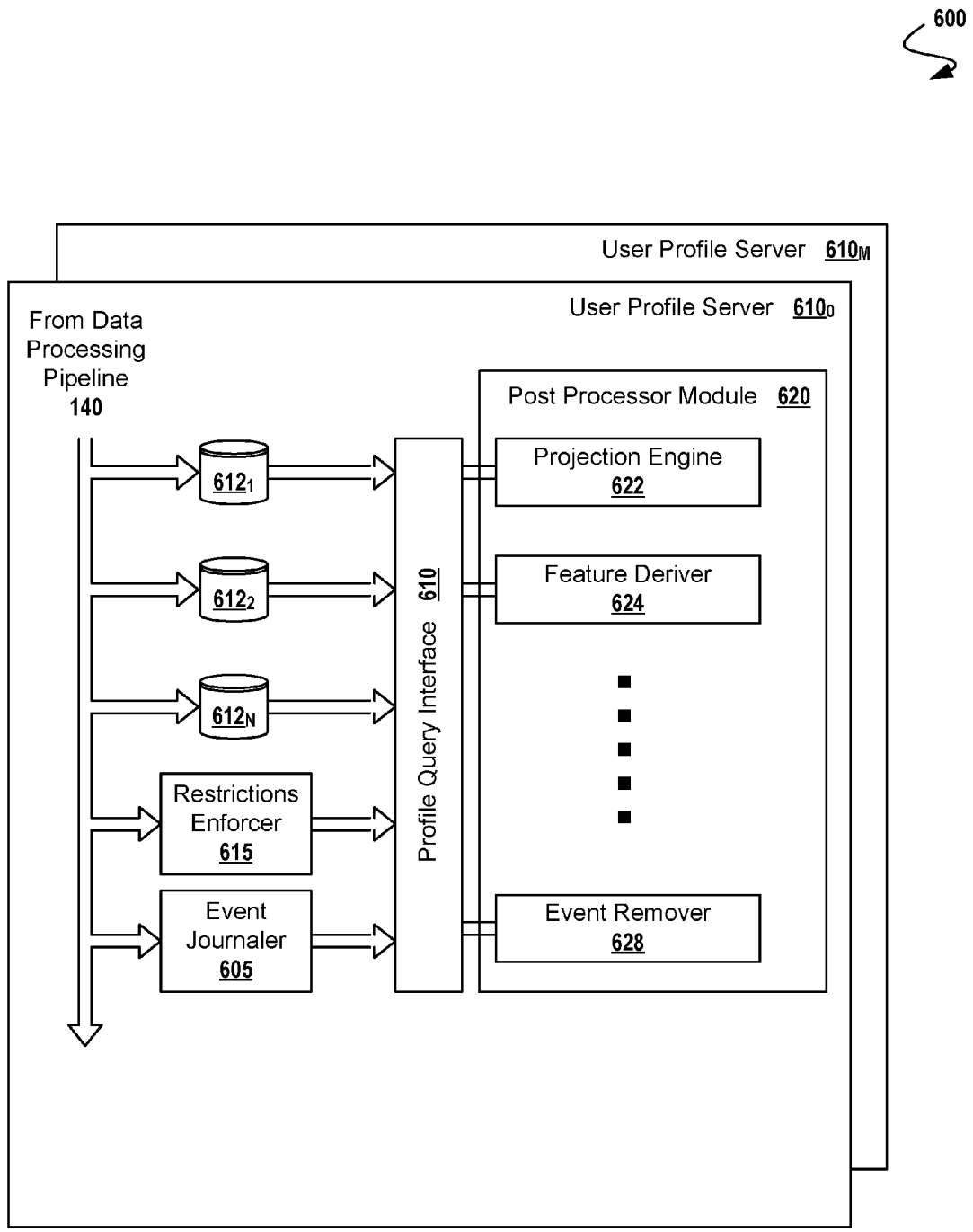
FIG. 6 depicts a system for providing temporally updated user profiles on demand, according to one embodiment.

FIG. 6 depicts a system for providing temporally updated user profiles on demand. As shown in system 600, a plurality of user profile servers $610_0$-$610_M$ comprise a connection to a network 130, which network serves for delivering data from a user profile data processing pipeline 140 to the user profile server 610. Also shown is an event journaler 605 and a profile query interface 612.

An event journaler 605 records events as they arrive, and a profile query interface 612 provides copies of a profile on demand (e.g. to a requester, upon receipt of a requester's query), possibly after being processed by one or more components within a post-processing module 620 (e.g. projection engine 622, feature deriver 624, event filter 628). Using these modules, the user profile server 610 can provide copies of the profile on demand, where the provided user profile is:

Consistent: That is, the user profile contains all data and events record until a specific time.

Reproducible: A user profile can be reproduced on demand given a historical copy of the profile.

Event Journal

The event journaler 605 records received events pertaining to a particular user and maintains the current state of the user. In the embodiment shown, the event journaler supports four operations: add events, add derived features, projections, and remove events. The event journaler combines the features of a file system journal with features of a software version control system (e.g. sub-version management, subversion management, etc). In some cases, updates are written to the event journal, which updates affect only the logical storage rather than the physical storage. In some cases, the user profile is versioned and historical views are supported. Also, the event journaler supports event removal (e.g. for removing events that may be subject to privacy restrictions), and as shown, any rules or restrictions may be codified for a restrictions enforcer 615, and any sorts of governmental- or commercial- or even user-specific rules or restrictions can be enforced.

Add Events

Events e are recorded as tuples $(t_r, t_g, e)$ where $t_r$ is the time an event was received and $t_g$ is the time the event was generated. In modern data recording systems, there are often delays such that events are received well after events are generated, which situation often causes the events to be recorded out of order. Thus, the event log is represented as a set of tuples U as described above. Upon receipt of new events the log is updated as follows:

$$U' = U \cup (t_r, t_g, e)$$

where U is the user's log prior to the update and $t_r$ is the current time. In the embodiment shown, events are immutable once added.

Projection

The projection of a profile at a moment in time is denoted as $\tau(U,t_1,t_2)$. The most common projection operator is $\tau(U,t_2)$ where it is assumed that $t_1=0$. Projection can be described as an operation that "replays" the logs from $t_1$ to $t_2$, such that:

$$\tau(U,t_1,t_2)=\{(t_r,t_g,e) | (t_r,t_g,e) \in U \wedge t_1 \leq t_r \leq t_2\}$$

A projection engine 622 serves to replay the logs from time=$t_1$ to time=$t_2$.

Derived Features

A derived feature is a special type of event that is the result of a computation on a projection of the profile. Denote the event of a derived feature as $e=(f,f(\tau(U,0,t_g)))$ and the event $(t_r,t_g,e)$ is added to the log where $t_g$ is the time of the projection and $t_r$ is the current time. Upon inspection of the event, the system immediately knows what was the latest event time of the user even if the feature was computed some time later. Derived features are mutable in the sense that, unless requested, only the most recently derived features are returned rather than all historical features. Such operations may be performed by a feature deriver 624.

Remove Events

In some cases, it may be necessary to remove events from a user's profile. Removing events recorded before time t creates a ripple of updates to all derived features that relied upon this data. Because transactions are stored with a timestamp, transactions that occurred after the deletion are retained, but any future transactions recorded after the deletion has occurred should be adjusted accordingly. By convention, instead of deleting events, a truncation operation is supported. All events (though typically, not derived features) are deleted until some point in time $t_d$. The truncation event $e_d=(t,t_d,x)$ is recorded, all projections are implicitly now $\tau(U, t_d, t)$, and all derived features are now based on the truncated projection. Following this convention, the update ripple is stopped at the first level.

Logging Temporal Information in User Profiles for Delivery to Consumers

For a process that consumes a user profile object, such a process almost always receives a profile that is out of date. With the above-described user profile, the consuming process can know how out of date the profile object is, and it can also ensure that future processing is consistent.

In other words, a process that performs actions given a user's profile needs access to the latest information about the user. Like a source code repository, the process subscribes to the state of the user as controlled by a centralized repository (e.g. a user 610). At some moment t, the consuming process requests the projection $\tau(u,0,t)$ from the user profile server. The user profile server polls the repository for updates, and the repository is guaranteed to be a central authority for a user's profile. Each user's profile is treated as independent. It does not need to be the case that one server maintains all users' profiles, but only one user profile server must maintain a particular user's profile. For a given user u, there is a deterministic mapping between a user and the one server that maintains the corresponding profile.

Within a distributed system of journalized publisher-subscriber relationships, user profiles will always be out of date. The user profile server logs any decision it makes based on the user's profile. This logged event is of the form of a derived feature: $(t,t_g,e)$ where $t_g$ is the latest timestamp of the user's projection. The user profile server that makes decisions based on the user profile logs the version of the user profile used for the decision making process when the decision is logged. With this simple logging protocol, the state of the user's profile can be reconstituted from the journal and the user profile server's action can be replayed for subsequent analysis. The state of the profile that was present at the time of serving can be computed using the projection $\tau(U,0,t_g)$.

In situations of actual real-time operation, user profiles will arrive with varying states of incompleteness. Upstream processes rely on the journaling system to record (and report) the states of incompleteness. In the case of a derived feature, such a feature might be computed only once per minute, but a feature such as number of page views on the current page might be computed interactively based on incoming real-time data. The event journaler records the last update to the categorized query feature. Similarly, the number of page views may be computed in real-time, and the event journaler 605 might log the value as well as the last version of the user's profile it had. As events arrive back into the event logs, the version information can be used to reconstruct the state of a user profile to the extent of the server's knowledge. This logging scheme also allows one to measure the latency between recording events and serving requests, as well as diagnose errors in serving logic.

Profile Query Interface

The profile query interface 612 supports query-based retrievals by any consumer/analysis process. Moreover, profile query interface 612 supports a bag-of-events matching model (see Indexing Overview, infra) Like the bag of words, the bag-of-events treats each event as a separate term. The consumer/analysis process can query "car insurance" and see the users who searched for "car insurance" in the past. The consumer/analysis process can then inspect individual user profiles (in a privacy preserving way), look at a session, and possibly reformulate the query.

From the query results, a consumer/analysis process can inspect the results, refine the queries, and consider the resulting users as a segment for targeting. A results page provided by the profile query interface contains, for example, the size of the targetable population and the performance of the campaign given a set of objectives. A modeling team might employ such a consumer/analysis process (and/or the profile query interface) for retrivals, and during the search for targetable users, query refinements of, and interactions with, the results might give the modeling team insight into the targeting system, much like traditional ranking in web search. In some embodiments, a search query can be formulated within a search agent and continuously re-executed for targeting analysis or other consumer/analysis processes. Alternatively, the query results can be used as seeds for a targeting model.

Continuing with the discussion of FIG. 6, profile query supports the following types of queries:

Vector-space matching.
Similarity and dissimilarity to users.
Rules-based matching.

The query results will support various reports such as:

Number of matched users.
Number of matched users in different sub-segments, such as clicks on an ad, in order to estimate CTR.
Drill-down to the level of individual users to analyze their sessions.
Target the top N matching users for the query daily.
Label some set of users as positives or negatives for training a model for the labeled segment.
Binary Queries: Queries in disjunctive normal form where the terms are events. By transforming the query, temporal and frequency ranges can be matched.

With appropriate data transforms, other logical queries can be supported.

General-Purpose Scoring Engine

Now, returning to the discussion of FIG. 5, and specifically the discussion of the scoring subsystem and capabilities of the scoring subsystem 145, as may be understood by those skilled in the art, there are two significant challenges in machine learning at web scales, (1) training learning algorithms, and (2) scoring the learned models. The following paragraphs describe a general purpose scoring subsystem 145 capable of handling a large set of learning algorithms.

In the embodiment of FIG. 5, the scoring subsystem 145, and more particularly, modules within the scoring subsystem 145 (e.g. the scoring engine 550) may be based on a search engine. For purposes of the following discussion it is reasonable to abstract into operations of the search engine to describe and solve the top-k problem. The top-k problem seeks to find the k indexed documents (e.g. user profiles) with maximum similarity to a provided document x. A similarity function may be defined as follows:

$$\theta(x, d; w) = \sum_{i=1}^{n} x_i w_i d_i + \gamma_d$$

where the expression is a weighted inner product plus the addition of a document-dependent constant $\gamma_d$.

Indexing Overview

The scoring subsystem 145 relies in part on the availability of user profile objects that have been indexed for fast retrieval, even given the fast-changing (i.e. real-time) changes in the indexed user profile objects. That is, the user profile objects contain one or more records of time series (e.g. dynamic attribute descriptors 330) that may change as new events arrive. Following the characteristics of the aforementioned (and further discussed, below) bag-of-events representation, it is possible update the index (not shown) incrementally (e.g. as new events arrive) in order to keep it current.

Bag-of-Events

A user can be modeled (in part) as a bag-of-events much like other efforts have modeled a user based on a bag of words. In the bag-of-events aspect of user modeling, a user is represented as a vector of events in $R^n$ where n is the number of events and the value of each event is a number of occurrences of that event in a given time period such as per day. The similarity between two user profiles is the inner product $\langle x,y \rangle$ where x and y are the feature vectors associated with the users. A key difference from traditional information retrieval and user profile retrieval is the temporality. Various temporal-based user-model queries are supported, and queries may be coded to include temporal parameters, such as the time horizon of the query and the time horizon of the desired matched users. Such queries include:

Query Past, Match Past: Historical analysis
Query Past, Match Present: Profile analysis
Query Present, Match Past: Behavioral targeting
Query Present, Match Present: Social buzz Incremental Indexing Using Events The index (not shown) is partitioned both by user and by feature name. The user events that form the profile arrive daily. In the bag-of-events representation, each event has a unique identifier, so that one day's features are disjoint from another day's features. In an exemplary embodiment, when event data for day t arrives, the events from day t−k are removed and the events from day t are added to the index of k days' worth of events.

Big Index Environment

In most document retrieval settings, an index contains all documents, and queries are issued against the index. In the user history retrieval problem, the big index contains the historical profiles of all users. Queries are issued against the user profiles. A key challenge with the big index is maintaining consistency as user histories change. Any event can potentially change the query results; thus, the index should be constructed with features that can be computed incrementally (for example, as discussed above).

Linear Model

In the big index environment, linear models comprise a vector w of weights. Scoring the model may be as simple as issuing the query w against the index. The similarity function is defined as:

$$\theta(w,x) = \langle w,x \rangle$$

where x is a user profile in the index. This scoring function ignores any transformations such as in logistic regressions. Any monotonically increasing transformation will not affect the ranking of the documents, and any such monotonically increasing transformation can be applied later.

K-Nearest Neighbors

In multi-user similarity search, the queries find users in the index who are similar to a given set of users. Let $X^+$ denote the set of positive seed users and $X^-$ denote the set of negative seed users. The score for a given user in the index d is:

$$P(+ \mid d) = \frac{\sum_{x \in X^+} \theta(x, d)}{\sum_{x \in X^+} \theta(x, d) + \sum_{x \in X^-} \theta(x, d)}$$

where $\theta(x,d)$ is the similarity between users x and d. It is possible to approximate the above expression with an approximate similarity operator $\theta_k$ defined as follows:

$$\theta_k(x, d) = \begin{cases} \theta(x, d) & \text{if } d \in KNN(x) \\ 0 & \text{otherwise} \end{cases}$$

The score can be interpreted as the proportion of positive queries that match this document.

Kernelized Classifiers

The big index version of kernelized classifier scoring is similar to the multi-user similarity search case. Given a classifier of the following form:

$$g(d) = \sum_i \alpha_i k(x_i, d)$$

where $x_i$ is a user in the index, d is a user profile to query, and k(x,y) is a kernel function. If the kernel function can be approximated with the similarity function $\theta(x,y)$, then the classifier can be approximated as follows:

$$g(d) \approx \sum_i \alpha_i \theta_k(x_i, d)$$

where $\theta_k$ is the k-nearest-neighbor similarity. The approximation error depends on how accurately the kernel function is able to discriminate between the positives and negatives. This method works in cases when the kernel values and magnitude of the weights α are positively correlated, that is, when large α values apply to very similar users.

Small Index Environment

In the small index environment, the models are inserted in the index. Queries comprise user profiles. Several model types that can be indexed in the small index paradigm are discussed below.

Linear Models

Linear models are indexed as documents in the index. Let $w_i$ be the weights of a linear model i and then the similarity between the user and the model is the score of the model:

$$\theta(x,w) = \langle w, x \rangle$$

Ranking over the set of models sometimes produces undesired results when the scores are not well calibrated. One approach is to establish a threshold on the score for each model such that the ranked score is larger than the threshold. Another approach is to calibrate the model (for example) with a table for the scores that map all models in the same space.

K-Nearest Neighbors Classification

The k-nearest neighbor classification technique is quite similar to traditional information retrieval methods. Given a query x, let N be the set of user's k-nearest neighbors to x in the index. The score is then:

$$\theta(x, N) = \frac{n_+}{n_+ + n_-}$$

where $n_+$ is the number of positive neighbors, $n_-$ is the number of negative neighbors, and $|N|=n_+ + n_-$.

K-Nearest Neighbors Density Estimation

Density estimation with k-nearest neighbors is similar to the classification case. The score is the volume of the ball accounted for by the top k nearest documents.

$$P(x) = \frac{k}{\theta(x, d_k)}$$

where $\theta(x,d_k)$ is the similarity of the k th nearest neighbor.

Kernelized Classifiers

As in the big index environment, the kernelized classifier extends the k-nearest neighbor scorer with weights associated with each document in the index. The decision function of a kernelized linear model is $$g(x) = \sum_{d \in D} \alpha_d k(x, d)$$

where k(x,d) is a kernel function and $0 \leq \alpha_d \leq C$ is a weight. Additionally, there exists a class of kernels called linearizable kernels with the following properties:

$$k(x,y) = \langle \Phi(x), \Phi(y) \rangle$$

$$\Phi_m : R^n \to R_+^m$$

$$n \leq m$$

where the kernel function maps a user to a high-dimensional space that permits a finite representation or approximation. One such kernel function is the Laplacian kernel:

$$k(x, y) = \prod_{i=1}^{d} e^{(-|x_i - y_i|)}$$

with the following representation for $\Phi_m$:

$$\Phi(x_i) = (\delta(x; \gamma_1, \Delta_1), \ldots, \delta(x; \gamma_p, \Delta_q))$$

$$\delta = \lceil \frac{x - \gamma}{\Delta} \rceil$$

where γ is the offset of the bin and Δ is the width of the bin.

Figure 7:
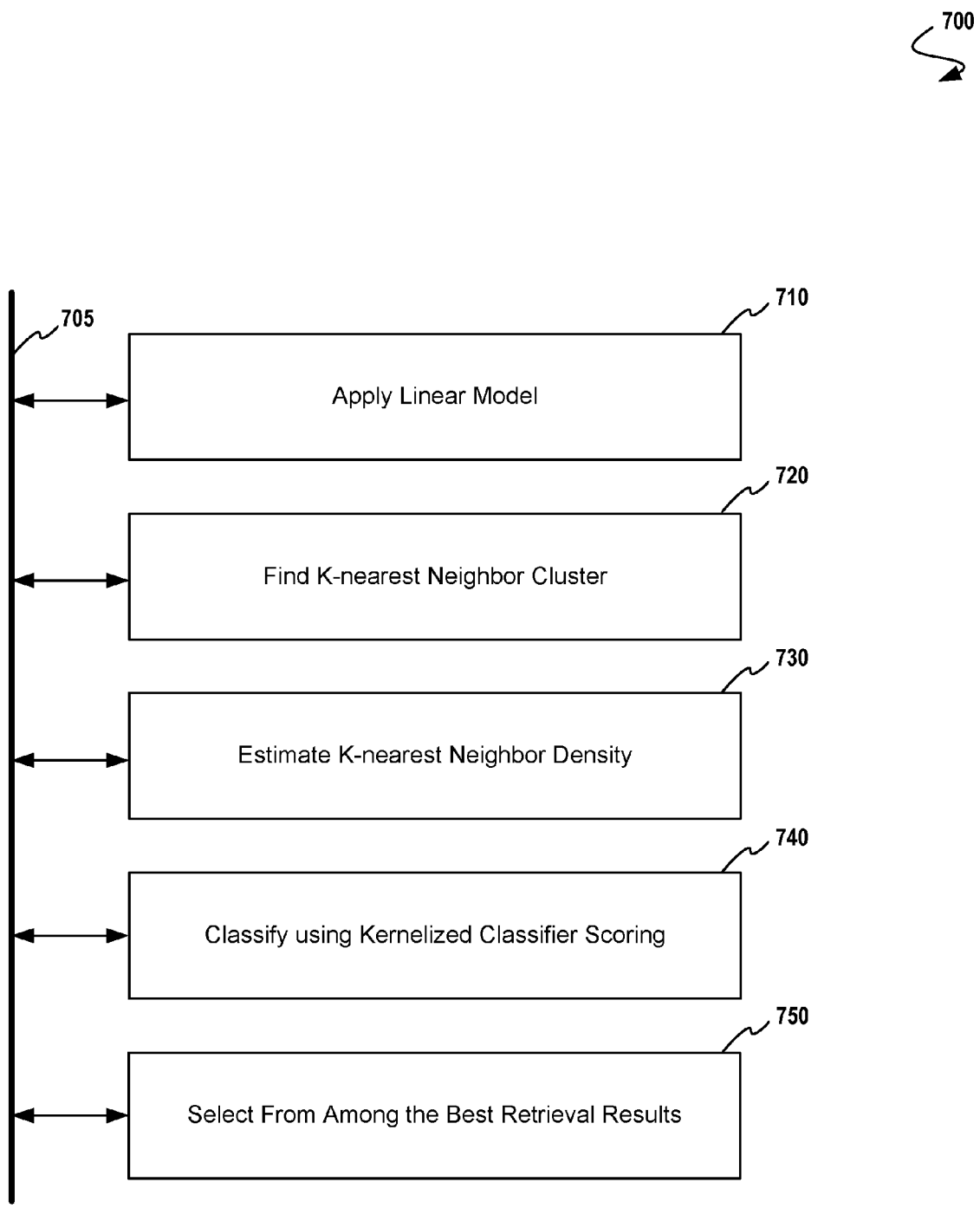
FIG. 7 depicts an operation chart of a method for user profile object retrieval, based on a plurality scoring techniques, according to one embodiment.

FIG. 7 depicts an operation chart of a method for user profile object retrieval, based on a plurality of scoring techniques. The method 700 starts with a query (not shown). Some portions (or all of) the query are then used as the definition of the object to match against. As earlier discussed, the various disclosed methods for retrieval exhibit relatively better (or worse) accuracy, depending on a variety of factors. Accordingly, the method includes an operation for selecting from among the best retrieval technique results (see operation 740). In the embodiment shown, several scoring and retrieval method are calculated, namely an operation to apply a linear model (see operation 710), and operation to find the k-nearest neighbor cluster (see operation 720), an operation to estimate the k-nearest neighbor density (see operation 730), a scoring operation to classify using a kernelized classifier (see operation 740), and an operation for returning query results based on selecting from among the best retrieval results (see operation 750). As shown, any one or more of the aforementioned operations 710-750 might communicate with any other operation over communication bus 705.

Figure 8:
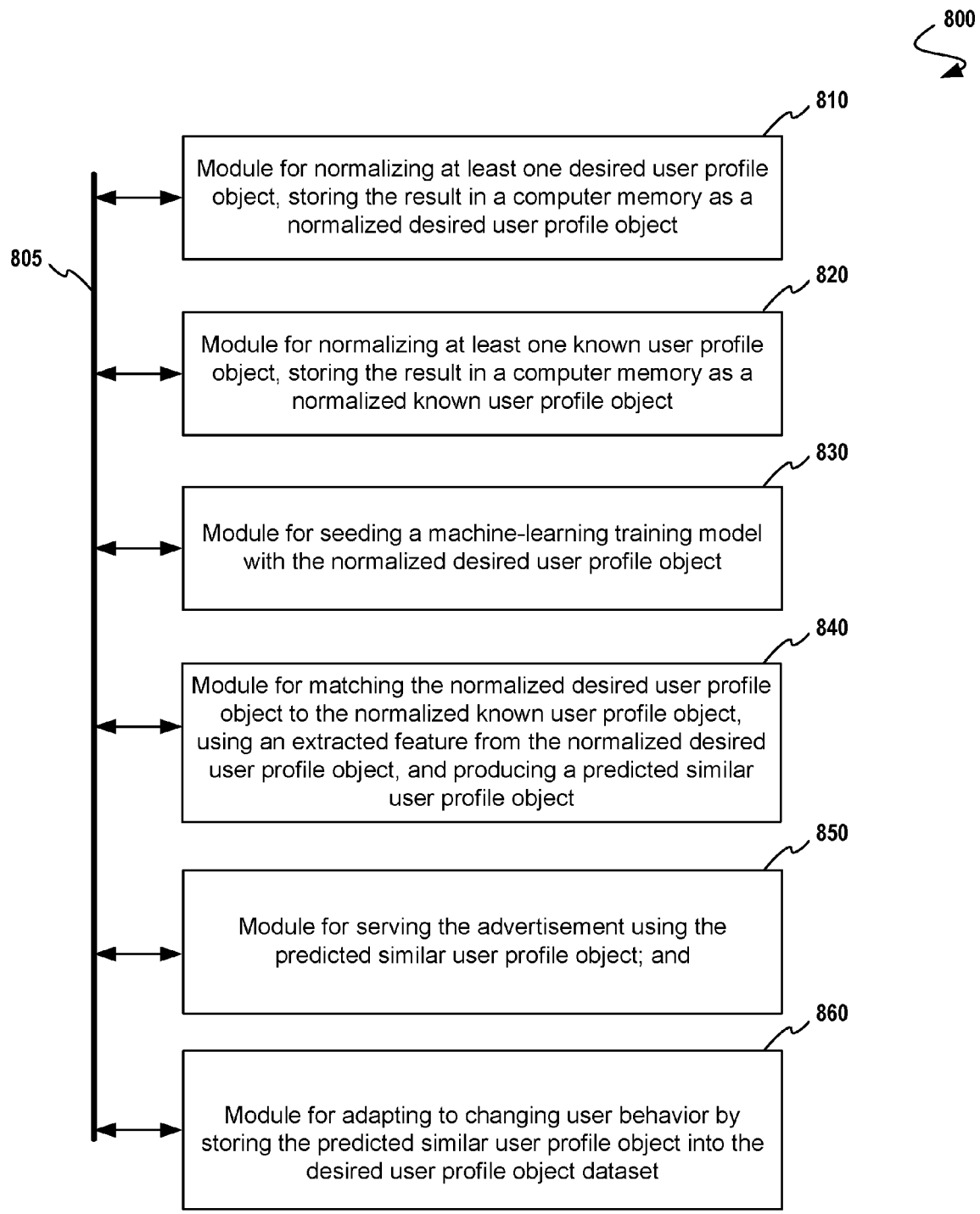
FIG. 8 depicts a block diagram of a system for adaptive display of an advertisement to look-alike users using a desired user profile dataset, according to one embodiment.

FIG. 8 depicts a block diagram of a system for adaptive display of an advertisement to look-alike users using a desired user profile dataset. As an option, the present system 800 may be implemented in the context of the architecture and functionality of the embodiments described herein. Of course, however, the system 800 or any operation therein may be carried out in any desired environment. As shown, system 800 includes a plurality of modules, each connected to a communication link 805, and any module can communicate with other modules over communication link 805. The modules of the system can, individually or in combination, perform method steps within system 800. Any method steps performed within system 800 may be performed in any order unless as may be specified in the claims. As shown, system 800 implements a method for adaptive display of an advertisement to look-alike users using a desired user profile dataset, the system 800 comprising modules for: normalizing at least one desired user profile object, storing the result in a computer memory as a normalized desired user profile object (see module 810); normalizing at least one known user profile object, storing the result in a computer memory as a normalized known user profile object (see module 820); seeding a machine-learning training model with the normalized desired user profile object (see module 830); matching the normalized desired user profile object to the normalized known user profile object, using an extracted feature from the normalized desired user profile object, and producing a predicted similar user profile object (see module 840); serving the advertisement using the predicted similar user profile object (see module 850); and adapting to changing user behavior by storing the predicted similar user profile object into the desired user profile object dataset (see module 860).

Figure 9:
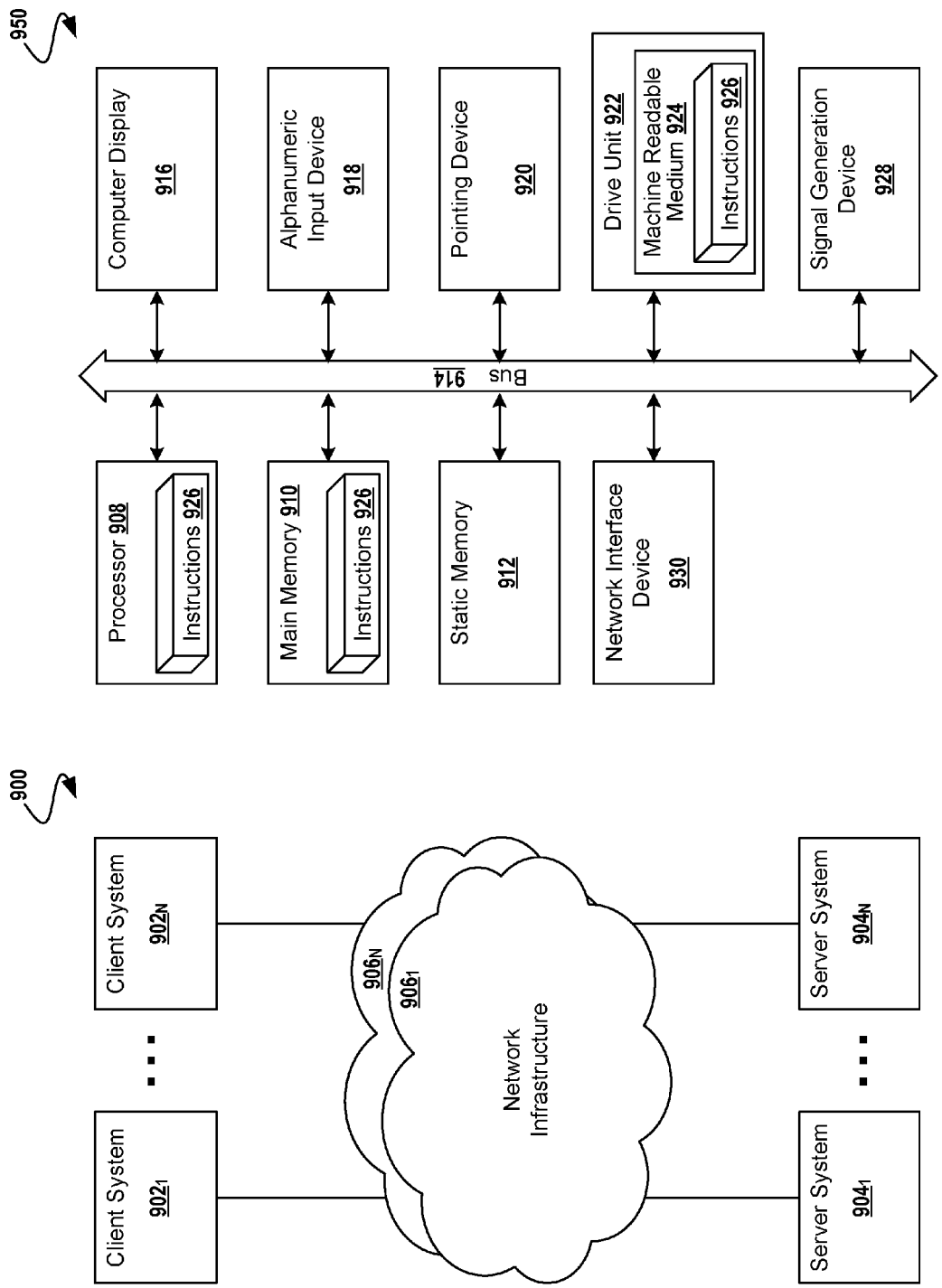
FIG. 9 is a diagrammatic representation of a network, including nodes for client computer systems, nodes for server computer systems, and nodes for network infrastructure, according to one embodiment.

FIG. 9 is a diagrammatic representation of a network 900, including nodes for client computer systems $902_1$ through $902_N$, nodes for server computer systems $904_1$ through $904_N$, nodes for network infrastructure $906_1$ through $906_N$, any of which nodes may comprise a machine 950 within which a set of instructions for causing the machine to perform any one of the techniques discussed above may be executed. The embodiment shown is purely exemplary, and might be implemented in the context of one or more of the figures herein.

Any node of the network 900 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 950 includes a processor 908 (e.g. a processor core, a microprocessor, a computing device, etc), a computer memory (e.g. main memory 910) and/or a static memory 912), which communicate with each other via a bus 914. The machine 950 may further include a display unit 916 that may comprise a touch-screen, or a liquid crystal display (LCD), or a light emitting diode (LED) display, or a cathode ray tube (CRT). As shown, the computer system 950 also includes a human input/output (I/O) device 918 (e.g. a keyboard, an alphanumeric keypad, etc), a pointing device 920 (e.g. a mouse, a touch screen, etc), a drive unit 922 (e.g. a disk drive unit, a CD/DVD drive, a tangible computer readable removable media drive, an SSD storage device, etc), a signal generation device 928 (e.g. a speaker, an audio output, etc), and a network interface device 930 (e.g. an Ethernet interface, a wired network interface, a wireless network interface, a propagated signal interface, etc).

The drive unit 922 includes a machine-readable medium 924 on which is stored a set of instructions (i.e. software, firmware, middleware, etc) 926 embodying any one, or all, of the methodologies described above. The set of instructions 926 is also shown to reside, completely or at least partially, within the main memory 910 and/or within the processor 908. The set of instructions 926 may further be transmitted or received via the network interface device 930 over the network bus 914.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for adaptive display of an advertisement to look-alike users using a desired user profile dataset, the method comprising:
    obtaining, by a computer, a plurality of known user profiles of known users who have been recorded to interact with an advertiser, wherein each of the plurality of known user profiles includes:
        historical components reflecting a stream of events of the known user prior to a current time, and
        a temporary component reflecting a state of the known user at the current time;
    automatically creating, by a computer, a plurality of desired user profiles of desired users who are not included in the plurality of known user profiles, wherein each of the plurality of the desired user profiles includes:
        historical components reflecting a stream of events of the desired user prior to the current time, and
        a temporary component reflecting a state of the desired user at the current time;
    scoring, by a computer with a machine-learned model, similarities between the plurality of desired user profiles with the plurality of known user profiles based on the temporal component of the plurality of known user profile and the temporal component of the plurality of desired user profile for adapting to changes of user behavior;
    selecting, by a computer, a predicted user from the desired users based on the score of the plurality of desired user profile and; and
    serving, by a computer, an advertisement to the predicted user.

2. The method of claim 1, wherein the similarity between a desired user and a known user comprises a similarity between a current component of the desired user and a historical component of the known user.

3. The method of claim 1, wherein the similarity between a desired user and a known user comprises a similarity between a current component of the desired user and a current component of the known user.

4. The method of claim 1, wherein the similarity between a desired user and a known user comprises a similarity between a historical component of the desired user and a historical component of the known user.

5. An advertising server, comprising at least one processor and processor-readable storage medium, wherein the storage medium comprise a set of instructions for adaptive display of an advertisement to look-alike users using a desired user profile dataset, and wherein when executing the set of instructions, the processor is directed to:

obtain a plurality of known user profiles of known users who have been recorded to interact with an advertiser, wherein each of the plurality of known user profiles includes:
   historical components reflecting a stream of events of the known user prior to a current time, and
   a temporary component reflecting a state of the known user at the current time;
automatically create a plurality of desired user profiles of desired users who are not included in the plurality of known user profiles, wherein each of the plurality of the desired user profiles includes:
   historical components reflecting a stream of events of the desired user prior to the current time, and
   a temporary component reflecting a state of the desired user at the current time;
score through a machine-learned model similarities between the plurality of desired user profiles with the plurality of known user profiles based on the temporal component of the plurality of known user profile and the temporal component of the plurality of desired user profile for adapting to changes of user behavior;
select, by a computer, a predicted user from the desired users based on the score of the plurality of desired user profile and; and
serve an advertisement to the predicted user.

6. The advertising server of claim 5, wherein the similarity between a desired user and a known user comprises a similarity between a current component of the desired user and a current component of the known user.

7. The advertising server of claim 5, wherein the similarity between a desired user and a known user comprises a similarity between a current component of the desired user and a historical component of the known user.

8. The advertising server of claim 5, wherein the processor is directed to score the similarities based on a linear model.

9. The advertising server of claim 5, wherein the processor is directed to score the similarities based on a clustering model.

10. The advertising server of claim 5, wherein the processor is directed to score the similarities based on a classifier.

11. A non-transitory computer readable medium comprising a set of instructions for adaptive display of an advertisement to look-alike users using a desired user profile dataset which, when executed by a computer, cause the computer to perform actions of:

obtaining a plurality of known user profiles of known users who have been recorded to interact with an advertiser, wherein each of the plurality of known user profiles includes:
   historical components reflecting a stream of events of the known user prior to a current time, and
   a temporary component reflecting a state of the known user at the current time;
automatically creating a plurality of desired user profiles of desired users who are not included in the plurality of known user profiles, wherein each of the plurality of the desired user profiles includes
   historical components reflecting a stream of events of the desired user prior to the current time, and
   a temporary component reflecting a state of the desired user at the current time;
scoring, with a machine-learned model, similarities between the plurality of desired user profiles with the plurality of known user profiles based on the temporal component of the plurality of known user profile and the temporal component of the plurality of desired user profile for adapting to changes of user behavior;
selecting, by a computer, a plurality of predicted users from the desired users based on the score of the plurality of desired user profile and; and
serving an advertisement to the predicted user.

12. The non-transitory computer readable medium of claim 11, wherein the similarity between a desired user and a known user comprises a similarity between a current component of the desired user and a current component of the known user.

13. The non-transitory computer readable medium of claim 11, wherein the similarity between a desired user and a known user comprises a similarity between a current component of the desired user and a historical component of the known user.

14. The non-transitory computer readable medium of claim 11, wherein the scoring of the similarities is based on a linear model.

15. The non-transitory computer readable medium of claim 11, wherein the scoring of the similarities is based on a clustering model.

16. The non-transitory computer readable medium of claim 11, wherein the scoring of the similarities is based on a classifier.

* * * * *